United States Patent Office 3,213,417
Patented Oct. 19, 1965

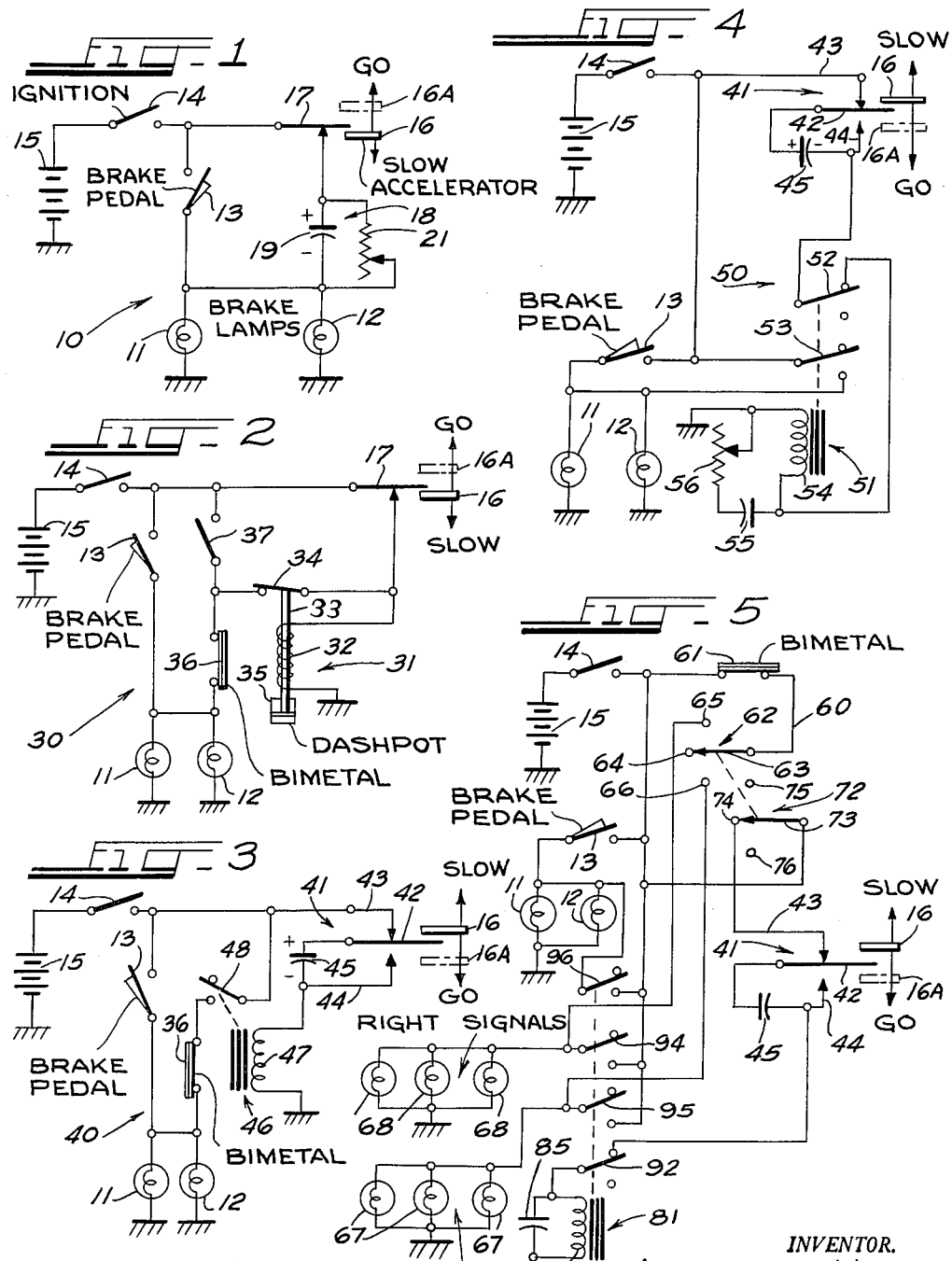

3,213,417
VEHICLE ACCELERATION SIGNALLING SYSTEMS
Alexander J. Lewus, 1617 S. 47th Court, Cicero, Ill.
Filed Dec. 31, 1962, Ser. No. 248,701
3 Claims. (Cl. 340—67)

This invention relates to a new and improved warning signal system for automotive vehicles and more particularly to a warning signal system that automatically signals interruption of acceleration by the vehicle, using the same signal lamps on the vehicle that are ordinarily employed for other purposes.

In the operation of automotive vehicles such as cars, trucks, and the like, two forms of signalling are presently mandatory in most States. The vehicles are required to include a first set of signal lamps that are actuated by means of a suitable switching device or the like controlled by some part of the brake system of the vehicle, such as the brake pedal. The brake signal lamps, usually referred to as "stop lights," are energized when positive action is taken to decelerate the vehicle by application of the brakes.

The second set of signal lamps that is now required, in most areas, is used to signal an impending turn of the vehicle. These lamps are controlled by the vehicle operator, utilizing, in most instances, a switching device that is mounted on the steering post of the vehicle or on the dashboard. Ordinarily, these signal lamps are connected in a circuit that includes a "flasher" so that the external signal is a series of flashes from the lamps, tending to attract attention more easily than in the case of a steadily lit lamp. Furthermore, the use of flashing signals for turn indications makes it possible to utilize the lamps at the rear of the vehicle both as stop lights and as turn signal indicators, an arrangement that is frequently employed.

In many instances, it is quite important to the driver of a following vehicle to know when a given car or truck is beginning to decelerate, even though the brakes on the leading vehicle have not been applied. In high speed driving over the highway, for example, the mere relief of pressure on the accelerator pedal of a car or truck results almost immediately in substantial deceleration, but there is no external signal to warn the driver of a following vehicle that deceleration is taking place. Similarly, when a driver who has pulled out of his lane to pass another vehicle decides that it is not possible to do so, he may decelerate primarily by simple release of the accelerator, but there is no warning of this occurrence either to the driver of the car that he is passing (who may also decelerate and cause an accident) or to the driver of an oncoming car. Another instance in which deceleration produced merely by release of the accelerator may create a dangerous situation occurs under adverse winter driving conditions, especially where the driving surface is icy. Under these circumstances, it may be virtually essential for the driver of a car or truck to slow down substantially without applying his brakes, in order to avoid the possibility of a slide, but the driver of a following vehicle has no way of knowing that deceleration has been initiated, with the result that a collision may occur.

Special signalling devices have heretofore been proposed for the purpose of indicating release of the accelerator, in a vehicle, to protect other drivers and to warn them that the vehicle is decelerating even though the brakes have not been applied. These devices, operated from the accelerator pedal or other accelerator mechanism in the car, have not gained widespread acceptance for several reasons. In the first place, they have generally required the addition of separate signal lamps, usually amber lamps, to afford the necessary signalling indication, and this requirement for additional devices has in many instances been found objectionable. In addition, many drivers have not been aware of the significance of the separate signalling devices and have been more confused than assisted by their operation.

It is a principal object of the present invention, therefore, to provide a new and improved warning signal system for automatically signalling the interruption of acceleration, in the operation of an automotive vehicle, independently of application of the vehicle brakes.

A specific object of the invention is to provide a new and improved safety signalling system that operates automatically in response to operation of the accelerator of an automotive vehicle and affords a positive indication that the vehicle is decelerating due to release of the accelerator.

A specific object of the invention is to afford a warning signal system that automatically signals interruption of acceleration, in the operation of an automotive vehicle, by means of the brake or turn signal lamps, or both, that are already incorporated in the vehicle, so that no separate signal lamps or like devices are required for the system.

Another object of the invention is to afford a warning signal in the form of a short burst of signal flashes each time the accelerator pedal of an automotive vehicle is released.

An additional object of the invention is to provide a new and improved flashing device, comprising a time delay relay circuit, for use in a warning signal system of an automotive vehicle.

Accordingly, the present invention relates to a warning signal system for automatically signalling interruption of acceleration in the operation of an automotive vehicle of the kind including a set of brake signal lamps, means for actuating the brake signal lamps from the braking system of the vehicle, a set of turn signal lamps, and manually controlled means for actuating the turn signal lamps. A warning signal system constructed in accordance with the invention comprises an energizing circuit for at least one of the aforementioned sets of lamps that is independent of the usual actuating means therefor. The energizing circuit comprises accelerator switch means actuatable between first and second operating conditions in response to actuation of the vehicle accelerator between its idling and accelerating positions, respectively. The circuit further includes control means for completing the aforementioned energizing circuit for a predetermined and relatively short time interval each time the accelerator switch means is actuated to its first operating condition. The timing control means also is effective to maintain the energizing circuit in open condition, once the circuit has been opened, until the accelerator switch is subsequently actuated to its second operating condition and then back to its first operating condition.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a schematic circuit diagram of a warning signal system constructed in accordance with a first embodiment of the present invention;

FIG. 2 is a schematic circuit diagram of a further embodiment of the present invention;

FIG. 3 illustrates an additional embodiment of the invention that in many respects is similar to the circuit of FIG. 2;

FIG. 4 illustrates a further embodiment of the present invention, including an improved flasher relay; and FIG. 5 illustrates an additional embodiment of the invention.

As mentioned above, the warning signal system of the present invention is utilized in an automotive vehicle of the kind including a set of brake signal lamps and means for actuating the brake signal lamps from the braking system of the vehicle. In the signalling system 10 illustrated schematically in FIG. 1, the brake signal lamps 11 and 12 of the vehicle are shown connected in parallel with each other and in series with a conventional brake-pedal-operated switch 14. Switch 13 is connected through the ignition switch 14 of the vehicle to the vehicle battery or other D.-C. power supply 15. The normal operating circuits for the brake lamps 11 and 12 are completed by suitable ground connections at the lamps and at the battery 15.

The automotive vehicle in which the signalling system 10 of FIG. 1 is incorporated also includes a suitable accelerator, generally indicated by reference numeral 16. Accelerator 16, which is usually pedal operated, is actuatable between an idling position, shown in solid lines, and an accelerating position, the accelerating position being generally illustrated by a dash outline 16A but extending over a substantial range depending upon the degree of acceleration and the driving speed desired. In FIG. 1, accelerator 16 would be moved to position 16A, in the direction of the arrow marked GO, to accelerate the vehicle. Of course, after the car or other vehicle has been accelerated, return movement of the accelerator 16 in the direction of the arrow marked SLOW is effective to return the accelerator to its initial idling position.

The signalling system 10 comprises an energizing circuit for brake lamps 11 and 12 that is independent of the usual actuating means comprising the circuit controlled by brake pedal switch 13. This independent energizing circuit comprises a normally closed accelerator switch 17. Switch 17 remains closed as long as accelerator 16 remains in its idling position, as illustrated. Movement of accelerator 16 to its accelerating position 16A, however, is effective to open accelerator switch 17.

A timing control device 18 comprising a capacitor 19 is connected in series with switch 17 and brake lamps 11, 12. Capacitor 19 may be of polarized or non-polarized construction, and preferably constitutes a relatively large capacitor having a capacitance for example, from twenty-five thousand to one hundred fifty thousand microfarads. An adjustable discharge resistor 21 is connected in parallel with capacitor 19. Accelerator switch 17, in this circuit arrangement, is returned directly to ignition switch 14, so that the accelerator switch circuit is in parallel with and therefore independent of the normal operating circuit for the brake lamps comprising switch 13.

In the operation of the warning signal system 10 of FIG. 1, closing of switch 14 takes place in the usual manner at the time the vehicle in which the system is incorporated is started. When switch 14 is closed, accelerator 16 may have been moved to accelerating position 16A in order to feed gas to the vehicle engine. Consequently, switch 17 is open. Under these circumstances, and as long as brake pedal switch 13 is not closed, the brake signal lamps 11 and 12 remain unlit.

When the vehicle operator releases accelerator 16, as for the purpose of changing gears, the accelerator returns to its original or idling position 16. Switch 17 then closes, completing a circuit from battery 15 through ignition switch 14 and accelerator switch 17 and through timing device 18 to the signal lamps 11 and 12. Accordingly, the brake lamps are energized. But the lamps do not remain energized indefinitely, resistor 21 being large enough so that sufficient current cannot pass through this resistor to give an appreciable light output from the lamps. Consequently, as capacitor 19 charges up, the current to the lamps decays progressively in accordance with the usual capacitor charging current curve. Thus, lamps 11 and 12 are initially energized to afford maximum light output, but are reduced to a point at which they give no appreciable output within a fixed time interval that is determined by the capacitance of capacitor 19 and the resistance of resistor 21.

During subsequent operation of the vehicle, the operator actuates accelerator 16, in the GO direction, to accelerating position, as exemplified by position 16A. When this occurs, switch 17 opens and capacitor 19 discharges through resistor 21. This does not complete an operating circuit to the brake lamps 11 and 12, so that the lamps are not lit when the vehicle accelerates.

As soon as the operator releases accelerator 16, however, permitting it to return to its idling position, switch 17 closes. Again, the brake lamps are energized through the independent circuit comprising switch 17 and capacitor 19, affording an automatic signal that the vehicle is decelerating even though the brakes have not been applied and brake pedal switch 13 has not been closed. Each time the vehicle slows, due to release of the accelerator, a decaying flash signal is produced by the brake lamps; the signal cannot be reproduced, subsequently, until after the accelerator switch has been actuated to accelerating position and then permitted to return to its first or idling position.

The system of FIG. 1 affords a unique signal with respect to deceleration of the vehicle that is not available with commercial signalling arrangements, yet utilizes the same lamps as are ordinarily employed to signal operation of the vehicle brakes. The system does not interfere with the normal brake signal operation. Thus, when the accelerator is released to idle position and the brakes are applied, switch 13 is closed so that lamps 11 and 12 are energized continuously, even though the accelerator-controlled signal current decays in the manner described above.

FIG. 2 illustrates a warning signal system 30 that is in some respects quite similar to the system 10 of FIG. 1. Again, the conventional portion of an automotive signalling system employed for brake signalling is incorporated in the circuit, and comprises the brake lamps 11 and 12 connected to the vehicle battery 15 through a suitable brake pedal switch 13 and an ignition switch 14. Furthermore, system 30 again comprises an accelerator switch 17 that is normally closed. Thus, switch 17 is maintained in closed position as long as accelerator 16 remains in its idling position but is opened whenever accelerator 16 is moved in the direction of the GO arrow to an accelerating position 16A.

Warning signal system 30 also includes a time delay relay 31 having an operating coil 32 that is connected to battery 15 through accelerator switch 17 and ignition switch 14. The armature 33 of relay 31 is connected to a movable contact 34. Armature 33 extends into a dash pot 35; an oil-filled dash pot may be utilized if desired, but a pneumatic dash pot is quite acceptable. Relay 31 also includes means, not shown, for normally maintaining armature 33 in the illustrated position, in which contact 34 is maintained closed.

The contact 34 of relay 31 is connected in series in an independent energizing circuit for brake lamps 11 and 12. This circuit, beginning at battery 15, extends through ignition switch 14, through relay contact 34, and then through a bi-metal flasher device 36 to the two brake lamps. Device 36 is a conventional bi-metal switch that opens and closes relatively rapidly in response to the flow of a normal-operating current for the brake lamps. Devices of this kind are well known and are utilized to afford a flashing or blinking operation for turn signal indicators on vehicles for general commercial use.

System 30 also includes a manually actuated switch 37 that is connected in parallel with relay contact 34. Switch 37 may be located on the dashboard of the vehicle, or on the steering column, and permits separate manual control of the brake lamps 11 and 12 as described more fully hereinafter.

Operation of system 30 of FIG. 2 is essentially similar, in many respects, to system 10 of FIG. 1. When the vehicle in which the signalling system is incorporated is placed in operation, ignition switch 14 is closed. Assuming that accelerator 16 is actuated to an accelerating position 16A, in order to start the engine, switch 17 is opened. Consequently, brake lamps 11 and 12 are not energized through the independent operating circuit comprising relay contact 34, the switch 17 being open.

When accelerator 16 is released, it returns to its normal idling position, moving in the direction indicated by the SLOW arrow. Switch 17 closes and completes an energizing circuit for brake lamps 11 and 12, this circuit extending from battery 15 through ignition switch 14 and accelerator switch 17 to relay contact 34 and thence through bi-metal flasher switch 36 to the brake lamps. Accordingly, the brake lamps 11 and 12 are flashed on and off by operation of the flasher switch 36 in the same manner as in conventional operation of turn signal indicator lamps.

But the closing of switch 17 also energizes the operating coil 32 of relay 31. Dash pot 35 prevents instantaneous actuation of the relay. Accordingly, the relay operates to open its contact 34 a predetermined time interval after closing of switch 17. The relay remains energized and holds contact 34 open as long as the accelerator remains in the idling position 16.

In subsequent operation of the vehicle, accelerator 16 is actuated to its accelerating position 16A, opening switch 17. When this occurs, the timing control relay 31 is de-energized and contact 34 of the relay returns to its normal closed position. Closing of this contact does not energize brake lamps 11 and 12, since switch 17 is now open and thus maintains the deceleration signalling circuit in open condition. When the vehicle operator subsequently releases the accelerator to idling position, however, switch 17 again closes and the brake lamps 11 and 12 are again flashed on and off for a short time interval, determined by dash pot 35, as described above.

In this embodiment, a manually controlled switch 37 is provided that is effective to energize signal lamps 11 and 12 independently of accelerator switch 17. This arrangement may frequently be desirable in conjunction with use of the system in trucks or other commercial vehicles where it is desired to have the brake lamps flash continuously when the vehicle is parked for deliveries. It should be noted that this circuit operates independently of the accelerator-controlled circuit of the invention. As long as switch 37 is open, the system provides a brief flashing signal at the supply line each time the driver releases accelerator 16 and permits deceleration of the vehicle. The flashing signal afforded in this embodiment of the invention is somewhat better than the single decaying signal afforded by the embodiment of FIG. 1, with respect to attraction of the attention of a driver of a following car. Otherwise, however, the operation is basically similar. As before, the system does not interfere in any way with normal use of lamps 11 and 12 as stop lights. Closing of brake pedal switch 13 energizes the lamps continuously regardless of the operating condition of the signalling circuit comprising accelerator switch 17.

FIG. 3 illustrates a warning signal system 40 which, like the preceding systems, is utilized in conjunction with the vehicle battery 15, the ignition switch 14, the brake switch 13, and the brake signal lamps 11 and 12. Signalling system 40 includes a single-pole double-throw accelerator switch 41 having a movable contact 42 that is normally engaged with and closed upon a fixed contact 43 but may be moved away from contact 43 into engagement with a second fixed contact 44. That is, contacts 42 and 43 are closed as long as the accelerator remains in its idling position 16, but these contacts are opened and contacts 42 and 44 close upon movement of the accelerator to an accelerating position as shown by phantom outline 16A.

The timing control means for the warning signal system 40 of FIG. 3 comprises a relatively large capacitor 45 and a control relay 46. Capacitor 45 is connected in a series circuit that extends from switch contact 42 and through the operating coil 47 of the relay to ground. The fixed switch contact 43 is connected back to the vehicle battery 15 through ignition switch 14. Switch contact 44, on the other hand, is connected to the opposite side of capacitor 45 from movable contact 42.

Control relay 46 is provided with a normally open contact 48 that is connected in a series circuit from ignition switch 14 through a bi-metal flasher 36 to brake lamps 11 and 12. Relay 46 may be of simple and quite conventional construction, contact 48 being closed whenever the relay is energized and being automatically opened whenever the relay is de-energized.

The overall operating effect of circuit 40 is essentially identical with that of the previously described system 30. Thus, when the vehicle is started, and assuming that the accelerator is in accelerating position 16A, closing of ignition switch 14 does not affect signal lamps 11 and 12, since accelerator switch 42 is opened. When the accelerator is released and moves back to its original position 16, switch contacts 42 and 43 close. This completes a charging circuit through capacitor 45 and through the operating coil 47 of relay 46. The charging current through the capacitor energizes the relay and closes contact 48. This completes an energizing circuit for brake lamps 11 and 12, through flasher 36, that is independent of the normal brake circuit through switch 13. Accordingly, the brake lamps flash on and off under the control of flasher 36.

The charging current through capacitor 45 decays relatively rapidly, with the result that relay 46 drops out after a predetermined time interval. This time interval may be of the order of two to five seconds, depending upon the size of the capacitor and the operating current required for relay 46, as well as the impedance of the relay coil 47. When the capacitor nears full charge, and the relay drops out, relay contact 48 opens and the flashing excitation for the brake lamps is ended.

In subsequent operation of the vehicle, actuation of accelerator 16 to its accelerating position 16A opens the charging circuit for capacitor 45 by opening switch contacts 42 and 43. At the same time, contacts 42 and 44 close, rapidly discharging the capacitor so that it will be ready for the next signalling operation. A suitable resistor may be incorporated in the discharge circuit, if desired, to minimize arcing at the contacts of switch 41, although this is not essential if switch contacts of adequate size and current-carrying capacity are employed. The signalling circuit remains inactive until the accelerator is again released and returns to its original idling position, permitting re-closing of contacts 42 and 43 of switch 41. As soon as the accelerator switch returns to its original operating condition, a short-duration flashing signal is again produced at the brake lamps in the manner described above. Again, the signalling circuit operates independently of brake pedal switch 13, which overrides the signalling circuit whenever the brakes are applied.

The circuit of FIG. 3, like that of FIG. 1, utilizes a single large capacitor as the basic timing control element, limiting the deceleration signal to a predetermined short time interval. In this instance, however, the amount of illumination produced at lamps 11 and 12 does not decrease with decay of the charging current of the capacitor.

Instead, the lamps are supplied with full voltage and full operating current during the signalling interval, since the relay contact 48 is connected directly back to battery 15, through ignition switch 14, and is not in series with the timing control capacitor.

FIG. 4 illustrates a warning signal system that employs the same general control arrangement as system 40 of FIG. 3 but combines the flasher control with the time control in an improved flashing control device. Like the previously described embodiments, the illustrated circuit includes the vehicle battery 15 connected through the ignition switch 14 and the usual brake pedal switch 13 to the brake signal lamps 11 and 12. The circuit further includes a capacitor timer like that of FIG. 3, comprising the accelerator-actuated switch 41 having a movable contact 42 that is normally engaged with a fixed contact 43, the contact 43 being connected through the ignition switch to the vehicle battery. As before, a large timing capacitor 45 is connected to switch contact 42 and is also connected to the remaining fixed contact of the switch, the normally open contact 44.

The timing control means of signalling system 50 further includes a flasher control relay 51 having a normally closed contact 52 and a normally open contact 53. One end of the operating coil 54 of this relay is connected through the normally closed contact 52 to capacitor 45, the other end of the coil being returned to ground. A capacitor 55 is connected in series with an adjustable resistor 56 across coil 54. The normally open contact 53 of the relay is connected in an energizing circuit for lamps 11 and 12, the circuit extending from ignition switch 14 through contact 53 to the brake lamps.

To place warning signal system 50 in operation, ignition switch 14 is closed. Again, it may be assumed that accelerator 16 is held in accelerating position 16A to supply fuel to the vehicle engine. Under these circumstances, and assuming that brake pedal switch 13 is not closed, there is no energizing circuit for brake lamps 11 and 12, the accelerator switch 41 being open at its contacts 42 and 43.

When the accelerator is released and returns to its idling position 16, contacts 42 and 43 close, completing a circuit from battery 15 through ignition switch 14 and switch contacts 42, 43 to the timing capacitor 45. The charging current for the capacitor flows through normally closed relay contact 52 and through the coil 54 of the control relay 51 to ground. Consequently, the control relay is actuated, closing contact 53 and energizing the signal lamps 11 and 12.

But actuation of the relay also opens contact 52, which is in series with the operating coil of the relay. Consequently, the energizing circuit for the relay is opened, the time required for interruption of the circuit being determined by the inertia of the relay mechanism. The relay does not drop out instantaneously, being held in by the discharge current from capacitor 55, which preferably is made substantially smaller than the main timing capacitor 45. After a short time interval, however, relay 51 does drop out, restoring the relay-energizing circuit at contact 52 and opening the lamp energizing circuit at contact 53. The charging current through capacitor 45 again actuates the relay, so that contact 53 again closes to illuminate the lamps and contact 52 opens, breaking the energizing circuit for the relay. As before, the relay is held in for a short time interval by the discharge of the delay capacitor 55. It is thus seen that lamps 11 and 12 are intermittently energized and de-energized for a time interval required to bring capacitor 45 up near its full charge, or at least to a charge level such that the charging current is no longer sufficient to actuate relay 51. Preferably, the circuit parameters are selected to afford a flashing signal over a predetermined time interval of the order of two to five seconds.

In continuing operation of the vehicle, accelerator 16 is again moved to its acceleration position 16A. When this happens, contacts 42 and 43 of switch 41 are opened and contacts 42 and 44 are closed. This completes a discharge circuit for timing capacitor 45 and discharges the capacitor so that it will be ready for the next signalling operation. When the operator subsequently releases the accelerator to idling position, contacts 42 and 43 close. Again, timing capacitor 45 is charged, over a reasonable time interval, producing a flashing signal at the brake lamps 11 and 12.

The circuit arrangement of FIG. 4 makes it possible to adjust the duration of each flashing signal from lamps 11 and 12 by adjusting the resistor 56 in the time delay circuit for relay 51. It also eliminates entirely the need for a bi-metal flasher of the kind used in the circuits of FIGS. 2 and 3, providing a somewhat more reliable device that is less dependent upon environmental temperature and other operating conditions to which the vehicle may be subjected. Yet this is accomplished without adding substantially to the cost of the circuit, as compared with the previously described flasher systems, since relay 51 serves the same function as the control relays incorporated in the circuits of FIGS. 2 and 3 in addition to providing for flashing operation of the brake lamps in the course of a signal indicating interruption of vehicle acceleration.

The circuit of FIG. 4, like those described hereinabove, provides an acceleration-dependent signal that is not effected through or dependent upon the brake switch used for brake signalling in the operation of the stop lights. Thus, if brake pedal switch 13 is closed by application of the vehicle brakes, a continuous energizing circuit is completed to the signal lamps and is maintained regardless of the operating condition of accelerator switch 41.

FIG. 5 illustrates a warning signal system 60 that incorporates both the brake lamps of the vehicle and its turn signal lamps. System 60 includes the vehicle battery 15 and ignition switch 14, connected through the usual brake pedal switch 13 to the stop lights 11 and 12. In addition, this system comprises a bi-metal flasher switch 61 that is connected from ignition switch 14 to a single-pole three-position turn signal control switch 62 having a movable contact 63 that is engageable with three fixed contacts 64, 65 and 66. Contact 64 is open circuited, representing the neutral or non-turning position of turn indicator switch 62. Contact 66 is connected to three left-turn signal lamps 67. One of the signal lamps 67 may be located at the left rear fender of the vehicle, one at the left front fender, and one at the dash to afford a left turn signal indication. Similarly, contact 65 of switch 62 is connected to three right-turn signal lamps 68 that may be located at the right front fender, right rear fender, and dash of the vehicle to afford a right turn signal arrangement. In each instance, the individual lamps are returned to ground.

As thus far described, the signalling circuits shown in FIG. 5 are generally conventional, and are essentially similar to or equivalent to those employed in automotive vehicles, whether passenger car or truck. With ignition switch 14 closed, stop lights 11 and 12 can be energized continuously by closing the brake pedal actuated switch 13. To signal a left turn, switch 62 is actuated to close contacts 63–66, energizing the left turn signal indicator lamps 67. The lamps are energized intermittently, due to operation of the bi-metal flasher switch 61. Similarly, to indicate a right turn, switch contacts 63 and 65 are closed, intermittently energizing signal lamps 68.

Signalling system 60 further includes a single-pole three position switch 72 that is ganged with turn signal indicator switch 62. Switch 72 includes a movable contact 73 that is engageable with three fixed contacts 74, 75 and 76. Contacts 75 and 76 are open circuited. Movable contact 73 is connected back through ignition switch 14 to the vehicle battery 15.

The remaining fixed contact 74 of switch 72, which is normally engaged by the movable switch contact 73, is connected to the fixed contact 43 of an accelerator switch 41. As before, switch 41 is provide with a movable contact 42 that is normally engaged by fixed contact 43, and with a second fixed contact 44 that is normally open but is engaged by contact 42 when the vehicle is accelerated. A timing capacitor 45 is connected between switch contacts 42 and 44.

Signalling system 60 further includes a control relay 81 having an operating coil 82. One terminal of coil 82 is connected to contact 44 of accelerator switch 41, the other terminal of the coil being grounded. A time delay capacitor 85 is connected in parallel with the relay coil; if desired, an adjustable resistor may be connected in series with capacitor 85, as shown in conjunction with the similar capacitor 55 in the circuit of FIG. 4.

Relay 81 includes a normally closed contact 92 and three normally open contacts 94, 95, and 96. The normally closed contact 92 is connected in series in the circuit extending from the accelerator switch to the operating coil of the relay. The first normally open contact 94 is connected, in series, in an energizing circuit for the right-turn signal lamps 68 that extends from the signal lamps back to ignition switch 14 and, accordingly, to battery 15. Similarly, the normally open contact 95 is connected in an energizing circuit for the left-turn signal lamps 67 and the normally open contact 96 is connected in an alternate energizing circuit for brake lamps 11 and 12.

In operation of warning signal system 60, it may again be assumed that ignition switch 14 is first closed with accelerator 16 moved to its accelerating position 16A to start the vehicle engine. Stop lights 11 and 12 are not energized, provided the brake pedal switch 13 is not closed, and the turn signal lamps are not actuated, provided the turn signal switch 62 is in its normal neutral position as illustrated, since the main circuit through accelerator switch 41 is open at contacts 42 and 43. Thus, there is no output signal from any of the signal lamps.

When the vehicle operator subsequently releases the accelerator and permits it to return to its normal idle position, switch contacts 42 and 43 close. As a result, capacitor 45 is charged through a circuit that begins at battery 15 and extends through ignition switch 14, switch 72, and switch 41. The charging circuit for the timing capacitor is completed through relay contacts 92 and the operating coil 82 of the control relay. Accordingly, the charging current for capacitor 45 energizes and actuates the relay.

When control relay 81 is actuated, contacts 94, 95 and 96 are all closed, energizing all of the vehicle signal lamps. Thus, the brake lamps 11 and 12 are energized through contact 96. The left-turn signal lamps, front and rear, and on the dash, are actuated through contact 95. The right-turn signal lamps are all energized through contact 94.

As in the case of relay 51 of FIG. 4, however, the energizing circuit for relay 81 is maintained complete only for a time interval sufficient to actuate the relay, since actuation of the relay opens contact 92 in series with the relay coil. The relay does not drop out instantaneously, but is held in for a very short time interval required to discharge the time delay capacitor 85. When capacitor 85 is discharged, the relay drops out, opening contacts 94, 95 and 96 and closing contact 92. The opening of contacts 94–96 de-energizes all of the signal lamps. The closing of contact 92 re-establishes the actuating circuit for the relay and, accordingly, again actuates the relay and re-establishes the energizing circuits for the lamps. This operation continues energizing all of the signal lamps 11, 12, 67 and 68, intermittently, until the charging current through the main timing capacitor 45 decays to a level such that it is no longer sufficient to actuate relay 81. Once this occurs, the signalling operation is completed. It is thus seen that this circuit, like those described above, completes an energizing circuit for the signal lamps for a predetermined short time interval upon actuation of the accelerator switch in response to movement of accelerator 16 to its normal or idling position.

When the vehicle operator subsequently depresses the accelerator to accelerating position 16A, contacts 42 and 43 open and contacts 42 and 44 close. Closing of contacts 42 and 44 completes a discharge circuit for the main timing capacitor 45; the capacitor is discharged and is thus made ready for the next signalling operation. As noted above, it may be desirable to incorporate some resistance in the discharge circuit in order to reduce arcing at the switch contacts, but this is not essential if the switch is capable of handling the full discharge current.

In subsequent operation of the vehicle, when the operator decides to slow down, the accelerator 16 is released and returns to its normal or idling position. When this occurs, contacts 42 and 43 are again closed, repeating the signalling operation described above. Thus, the system affords an intermittent flashing signal of short duration each time the accelerator switch is actuated to its initial operating condition, that shown in the circuit drawing, but the energizing circuit is thereafter maintained open by the capacitor 45 until such time as the accelerator switch is subsequently actuated to its second or acceleration-indicating condition and is again returned to its idling condition.

As in the previous systems, the signalling system 60 does not interfere with normal operation of the stop lights or the turn signal indication lights. Thus, if the brake pedal switch 13 is closed, stop lights 11 and 12 are energized continuously and quite independently of the operating condition of the accelerator switch 41. If the operator signals a right turn, actuation of switch 62 to its right turn condition open circuits the acceleration signalling system because switch 72 is simultaneously actuated to move contact 73 to the open circuited contact 75. Similarly, if switch 62 is actuated by the operator to indicate a left turn, then the acceleration signalling system is again open circuited at switch 72 because contact 73 moves to engagement with the open circuited contact 76.

In the various embodiments of the invention, it is of course possible to substitute known equivalent circuit elements for those specifically illustrated and described. For example, the actual power supply of the vehicle, usually a D.C. generator or an A.C. generator and rectifier, is shown only generally as the battery 15. The switches and relays used in the various circuits may be of more complex construction than those illustrated, and may, for example, include signal-actuated gating circuits such as transistorized gates or the like, so long as they perform the basic functions required by the various embodiments of the invention. The same is true of the bi-metal flashers; other intermittent-operation circuit devices affording equivalent performance may be used as desired.

Hence, while preferred embodiments of the invention have been described and illustrated, it is to be understood that they are capable of variation and modification, and I therefore do not wish to be limited to the precise details set forth, but desire to avail myself of such changes and alterations as fall within the purview of the following claims.

I claim:

1. A warning signal system for automatically signalling interruption of acceleration in the operation of an automotive vehicle of the kind including a D.C. supply, a set of brake signal lamps, means for energizing said brake signal lamps from said supply in response to operation of the braking system of the vehicle to signal braking of the vehicle, a set of turn signal lamps, and means for energizing said turn signal lamps from said supply to signal turning of the vehicle, said vehicle further including an accelerator actuatable between an idling position and an accelerating position, said warning signal system comprising an energizing circuit for at least one of said sets of lamps that is independent of the usual actuating means therefor, said energizing circuit comprising an accelerator switch means actuatable between first and second operating conditions in response to actuation of said accelerator between its idling and accelerating positions, respectively, and timing control means for completing said energizing circuit intermittently over a predetermined time interval of the order of 2–5 seconds each time said accelerator switch means is actuated to its first operating condition, and for thereafter maintaining said energizing circuit open until said accelerator switch means is actuated to its second operating condition and back to its first operating condition, said timing control means including a large timing capacitor connected, in series with said accelerator switch means, to said D.C. supply, a slow-release relay having an operating coil connected to said timing capacitor through a set of normally-closed contacts in said relay, and at least one set of normally open contacts in said relay connecting said one set of lamps to said D.C. supply, the release delay time of said relay being substantially less than the decay time for charging current through said timing capacitor whereby said relay is actuated and released several times during charging of said capacitor.

2. A warning signal system for automatically signalling interruption of acceleration in the operation of an automotive vehicle of the kind including a set of brake signal lamps, means for actuating said brake signal lamps in response to operation of the braking system of the vehicle to signal braking of the vehicle, a set of turn signal lamps, and turn signal switch means for actuating said turn signal lamps to signal turning of the vehicle, said vehicle further including an accelerator actuatable between an idling position and an accelerating position, said warning signal system comprising an energizing circuit for at least one of said sets of lamps that is independent of the usual actuating means therefor, said energizing circuit comprising a single-pole double-throw accelerator switch having normally open and normally closed contacts actuatable between first and second operating conditions in response to actuation of said accelerator between its idling and accelerating positions, respectively, and timing control means for completing said energizing circuit for a predetermined short time interval each time said accelerator switch is actuated to its first operating condition, and for thereafter maintaining said energizing circuit open until said accelerator switch is actuated to its second operating condition and back to its first operating condition, said timing control means comprising a large timing capacitor connected in series with said accelerator switch in a charging circuit extending through said normally closed contact whenever said switch is in its first operating condition and in a discharge circuit extending through said normally open contact whenever said switch is in its second operating condition, said time interval being determined by the charging time for said capacitor.

3. A warning signal system for automatically signalling interruption of acceleration in the operation of an automotive vehicle of the kind including a D.C. supply, a set of brake signal lamps, means for actuating said brake signal lamps in response to operation of the braking system of the vehicle to signal braking of the vehicle, a set of turn signal lamps, and turn signal switch means for actuating said turn signal lamps to signal turning of the vehicle, said vehicle further including an accelerator actuatable between an idling position and an accelerating position, said warning signal system comprising an energizing circuit for at least one of said sets of lamps that is independent of the usual actuating means therefor, said energizing circuit comprising an accelerator switch actuatable between first and second operating conditions in response to actuation of said accelerator between its idling and accelerating positions, respectively, and timing control means, comprising a delayed-reaction relay including an operating coil connected in series with said accelerator switch, an armature actuatable between first and second operating conditions in response to energization and de-energization of said operating coil, and at least one set of contacts actuated by said armature and electrically connected in series with said D.C. supply and said lamps, for completing said energizing circuit for a predetermined short time interval each time said accelerator switch is actuated to its first operating condition, and for thereafter maintaining said energizing circuit open until said accelerator switch is actuated to its second operating condition and back to its first operating condition, said timing control means further comprising dashpot means mechanically connected to said armature for delaying actuation of said relay contacts for said predetermined time interval following energization of said operating coil.

References Cited by the Examiner
UNITED STATES PATENTS 2,275,695    3/42    Stafford _____ 340—66
2,957,161    10/60    Daws _____ 340—66

NEIL C. READ, *Primary Examiner.*